US010055646B2

United States Patent
Bataller et al.

(10) Patent No.: US 10,055,646 B2
(45) Date of Patent: Aug. 21, 2018

(54) LOCAL CACHING FOR OBJECT RECOGNITION

(71) Applicant: Accenture Global Solutions Limited, Dublin (IE)

(72) Inventors: Cyrille Bataller, Mougins (FR); Anders Astrom, Singapore (SG); Vitalie Schiopu, Bertrange (LU); Hakim Khalafi, Amsterdam (NL)

(73) Assignee: Accenture Global Solutions Limited, Dublin (IE)

( * ) Notice: Subject to any disclaimer, the term of this patent is extended or adjusted under 35 U.S.C. 154(b) by 136 days.

(21) Appl. No.: 15/169,113

(22) Filed: May 31, 2016

(65) Prior Publication Data

US 2016/0350587 A1 Dec. 1, 2016

Related U.S. Application Data

(60) Provisional application No. 62/167,930, filed on May 29, 2015.

(51) Int. Cl.
*G06K 9/00* (2006.01)
*H04N 7/18* (2006.01)
(Continued)

(52) U.S. Cl.
CPC ..... *G06K 9/00765* (2013.01); *G06F 17/3028* (2013.01); *G06K 9/00255* (2013.01);
(Continued)

(58) Field of Classification Search
CPC .......... G06K 9/00255; G06K 9/00295; G06K 9/00718; G06K 9/00765; G06K 9/00771;
(Continued)

(56) References Cited

U.S. PATENT DOCUMENTS

| 7,643,658 B2 | 1/2010 | Kilner et al. |
| 2004/0008873 A1* | 1/2004 | Sogo ................... G06K 9/00288 382/118 |

(Continued)

FOREIGN PATENT DOCUMENTS

| CN | 101577006 | 11/2009 |
| EP | 2620896 | 7/2013 |

(Continued)

OTHER PUBLICATIONS

Australian Office Action for Application No. 2016203594, dated Feb. 9, 2017, 3 pages.

(Continued)

*Primary Examiner* — Amara Abdi
(74) *Attorney, Agent, or Firm* — Fish & Richardson P.C.

(57) ABSTRACT

Methods, systems, and apparatus, including computer programs encoded on computer storage media, for identifying people depicted in images. In one aspect, a process includes receiving an image from a camera. A face of a person is detected in the image. The image is compared to a set of images stored in a local cache. A determination is made whether the face of the person matches a face of a person depicted by at least one image of the set of images. In response to determining that the face of the person does not match a face of a person depicted by at least one image of the set of images, a selection is made of a highest quality image of the face of the person. A server system compares the highest quality image to images from data for the multiple people to identify the person.

20 Claims, 4 Drawing Sheets

(51) Int. Cl.
*G06T 15/20* (2011.01)
*G06T 19/00* (2011.01)
*G06F 17/30* (2006.01)
*G06K 9/62* (2006.01)
*G06T 7/00* (2017.01)
*G06T 7/80* (2017.01)
*G06T 7/73* (2017.01)
*G06T 7/13* (2017.01)
*G06T 7/292* (2017.01)
*G08B 13/196* (2006.01)

(52) U.S. Cl.
CPC ..... *G06K 9/00295* (2013.01); *G06K 9/00718* (2013.01); *G06K 9/00744* (2013.01); *G06K 9/00771* (2013.01); *G06K 9/00778* (2013.01); *G06K 9/6202* (2013.01); *G06K 9/6263* (2013.01); *G06T 7/0002* (2013.01); *G06T 7/13* (2017.01); *G06T 7/292* (2017.01); *G06T 7/75* (2017.01); *G06T 7/80* (2017.01); *G06T 15/205* (2013.01); *G06T 19/006* (2013.01); *H04N 7/18* (2013.01); *H04N 7/181* (2013.01); *G06K 2009/00738* (2013.01); *G06T 2207/10016* (2013.01); *G06T 2207/20061* (2013.01); *G06T 2207/30168* (2013.01); *G06T 2207/30201* (2013.01); *G06T 2207/30232* (2013.01); *G06T 2207/30242* (2013.01); *G08B 13/19602* (2013.01); *G08B 13/19608* (2013.01)

(58) Field of Classification Search
CPC ............ G06K 9/00778; G06K 9/6202; G06K 9/6263; G06K 2009/00738; G06T 7/0002; G06T 7/13; G06T 7/292; G06T 7/75; G06T 7/80; G06T 2207/10016; G06T 2207/20061; G06T 2207/30168; G06T 2207/30201; G06T 2207/30232; G06T 2207/30242; G06T 15/205; G06T 19/006; H04N 7/18; H04N 7/181; G08B 13/19602; G08B 13/19608; G06F 17/3028

See application file for complete search history.

(56) References Cited

U.S. PATENT DOCUMENTS

| | | |
|---|---|---|
| 2004/0258281 A1 | 12/2004 | Delgrosso et al. |
| 2005/0063569 A1 | 3/2005 | Colbert et al. |
| 2009/0174787 A1 | 7/2009 | Grim, III et al. |
| 2010/0329568 A1 | 12/2010 | Gamliel et al. |
| 2011/0013038 A1 | 1/2011 | Kim et al. |
| 2011/0050864 A1 | 3/2011 | Bond |
| 2011/0191329 A1* | 8/2011 | Petrov .............. G06F 17/30268 707/723 |
| 2012/0044247 A1 | 2/2012 | Naimark |
| 2012/0095958 A1 | 4/2012 | Pereira et al. |
| 2013/0169749 A1 | 7/2013 | Zhou et al. |
| 2013/0266181 A1* | 10/2013 | Brewer ............. G06K 9/00302 382/103 |
| 2014/0055553 A1 | 2/2014 | Lee et al. |
| 2014/0363046 A1 | 12/2014 | Besterman et al. |
| 2015/0078681 A1 | 3/2015 | Damola et al. |
| 2015/0098632 A1 | 4/2015 | Monta et al. |
| 2015/0117786 A1 | 4/2015 | James et al. |
| 2015/0294159 A1* | 10/2015 | Takahashi ............. H04N 7/181 382/103 |

FOREIGN PATENT DOCUMENTS

| | | |
|---|---|---|
| EP | 2911388 | 8/2015 |
| WO | WO 2013/147889 | 10/2013 |
| WO | WO 2014/061342 | 4/2014 |

OTHER PUBLICATIONS

Australian Office Action for Application No. 2016203594, dated Jun. 2, 2017, 2 pages.
Canadian Office Action for Application No. 2,931,748, dated Apr. 10, 2017, 4 pages.
Australian Office Action for Application No. 2016203579, dated Jun. 22, 2016, 5 pages.
Singapore Search Report for Application No. 10201604367V, dated Jul. 22, 2016, 3 pages.
European Extended Search Report for Application No. 16171900.0, dated Sep. 26, 2016, 10 pages.
Australian Office Action for Application No. 2016203594, dated Aug. 26, 2016, 5 pages.

* cited by examiner

LOCAL CACHING FOR OBJECT RECOGNITION

CROSS-REFERENCE TO RELATED APPLICATION

This application claims the benefit of U.S. Provisional Application No. 62/167,930, filed May 29, 2015, and titled "Video Analytics of Video Information," which is hereby incorporated by reference in its entirety.

BACKGROUND

Some video systems may analyze frames in a video stream to identify objects shown in the video stream. For instance, a video system may determine whether an object is a person and determine whether a face of the person is shown in a frame from the video stream.

SUMMARY

This specification generally describes systems, methods, devices, and other techniques for identifying people depicted in video streams received from cameras. For example, image frames of the video streams can be compared to images of known people to identify the people depicted in the video streams. As comparisons between image frames of the video streams and a large number of images of known people can demand a lot of computing resources and/or take a significant amount of time, systems and techniques described herein can reduce the number of image comparisons and the number of requests sent to a database that includes the images of the known people. For example, a face depicted in an image received from a camera can be compared to a local cache that includes images of people that were identified in the video streams recently, e.g., within a threshold amount of time, prior to sending a request to a larger database that includes more images of known people than the local cache.

In general, one innovative aspect of the subject matter described in this specification can be embodied in methods that include the actions of receiving, by a computing system, a first image from a first camera of a set of one or more cameras detecting, in the first image, a face of a first person. The computing system can compare the first image to a set of images stored in a local cache of the computing system. The set of images can include images of one or more persons. The one or more cameras can capture the images of the set of images. A determination can be made, based on the comparison, whether the face of the first person matches a face of a person depicted by at least one image of the set of images. In response to determining that the face of the first person does not match a face of a person depicted by at least one image of the set of images, the computing system can select, from one or more images of the first person, a highest quality image that includes a highest quality depiction of the face of the first person. The one or more images can include the first image. The computing system can also provide the highest quality image to a server system that stores data for multiple people. The server system can compare the highest quality image to images from the data for the multiple people to identify the first person. The server system can be separate from the local cache of the computing system. The computing system can receive, from the server system, data that identifies the first person. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Some aspects can include associating an identifier for the first person with the highest quality image and storing the highest quality image in the local cache as part of the set of images.

Some aspects can include receiving by the computing system, a second image of the first person. The computing system can detect a face in the second image. The computing system can compare the second image to the set of images. The computing system can determine that the face in the second image matches the face of the first person depicted in the highest quality image. In response to determining that the face in the second image matches the face of the first person depicted in the highest quality image, the identifier for the first person can be associated with the second image without providing the second image to the server system.

In some implementations, each image of the set of images depicts a person for which the computing system has received, from the server system, data that identifies the person depicted by the image in response to the image being provided to the server system.

Some aspects can include determining that the face of the first person is no longer visible in images captured by the first camera. A second image can be received from a second camera of the one or more cameras. The second image can depict a face that was not visible in images captured by the second camera within a threshold amount of time prior to the second image being captured. A determination can be made, based at least on relative locations of the first camera and the second camera, that the face depicted by the second image may be the face of the first person. The second image can be compared to one or more images of the face of the first person. A determination can be made, based on the comparison of the second image to one or more images of the face of the first person, that the face depicted by the second image matches the face of the first person. An identifier for the first person can be assigned to the second image.

In some aspects, determining, based at least on relative locations of the first camera and the second camera, that the face depicted by the second image may be the face of the first person further can include determining that the face depicted by the second image may be the face of the first person based on a time at which the face of the first person became no longer visible in images captured by the first camera and a time at which the second image was captured. In some aspects, determining, based at least on relative locations of the first camera and the second camera, that the face depicted by the second image may be the face of the first person further can include determining that the face depicted by the second image may be the face of the first person based on a travel direction of the first person with respect to a location of the first camera and a location of the second camera.

In some aspects, selecting the highest quality image can include identifying multiple images of the first person and determining the highest quality image from among the multiple images.

The subject matter described in this specification can be implemented in particular embodiments and may result in one or more of the following advantages. The number of image comparisons can be reduced by comparing a detected face to recently captured images stored in a local cache before comparing the detected face to images stored in a larger person database, thereby reducing the amount of computing resources and the amount of time taken to identify a person depicted in an image. By reducing the number of requests sent to the larger database over a network, the amount of network bandwidth consumed to identify a person depicted in image can be reduced, resulting in an increase in network speed for other data communications that use the network. The number of image comparisons can also be reduced by identifying potential matching people based on the relative locations of cameras and travel directions of people, and comparing detected faces to the potential matching people prior to, or instead of, comparing the detected faces to less likely matching people. Moreover, the number of requests sent to the larger database can be reduced by selecting a highest quality image, or an image determined to be of sufficient quality, to send in requests to the larger database to facilitate more reliable comparisons of images at the larger database.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
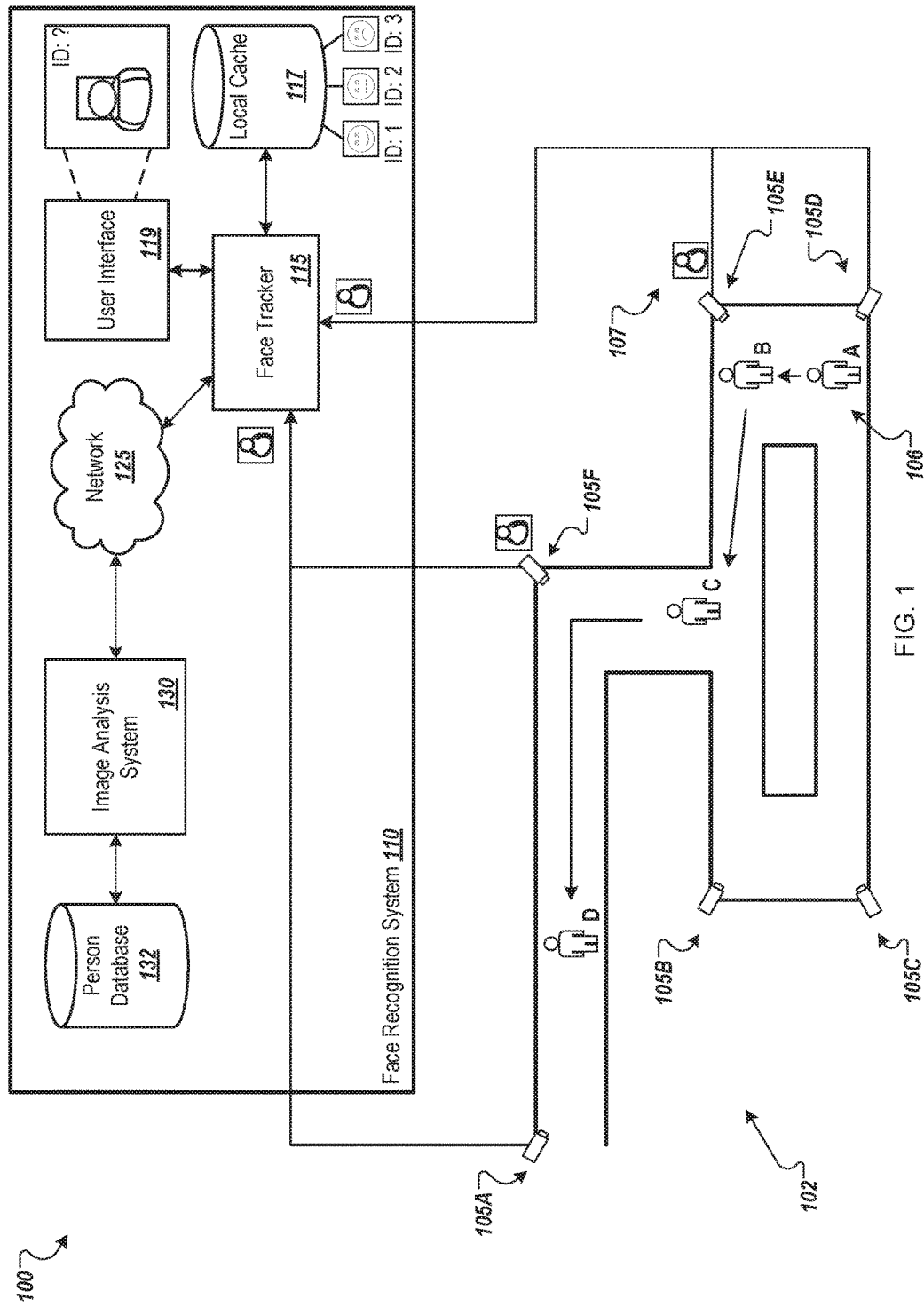
FIG. 1 is an example of an environment in which a face recognition system uses a local cache to track a face.

A face recognition system may receive a video stream, or multiple video streams, and identify people depicted in image frames of the video stream(s). For example, the face recognition system may compare faces depicted in image frames of the video stream(s) to images that depict faces of known people. The face recognition system can include a database of images and other data for known persons. To identify a person in a particular image, the face recognition system can compare the particular image to the images stored in the database. However, as the database can include a large number of images, e.g., thousands or millions of images, this image comparison process can consume lots of computing resources and/or take a significant amount of time to complete.

In addition, a video stream can include twenty-five to thirty or more frames per second. Comparing faces depicted in each image frame to other images can overload computing resources, require a lot of high speed and expensive computing equipment, and/or overload or dominate a network's bandwidth. A face recognition system described herein can reduce the number of images compared to the images of the database, resulting in less demand being placed on computing resources and less network bandwidth being consumed to send images to a computing system that compares the images to images stored in the database. For example, a face recognition system described herein can reduce the number of images compared to other images stored in the database based on (i) an ability to detect a face in images of a video stream and (ii) an ability to track a moving object, e.g., a moving face, across the field of view of a camera.

In some implementations, a computing system that receives video streams from a set of one or more cameras can include a local cache of images. The local cache can include images that depict faces of known people and/or that have been captured by a camera of the set of cameras. For example, the local cache can include images captured by the set of cameras within a threshold amount of time of a current time. In a particular example, the local cache can include images captured in the last hour. The images stored in the local cache may include only images that have previously been associated with a person based on the image depicting a face of the person. For example, the images stored in the local cache may be those that have been compared to the images stored in the database and matched to a known person based on the comparison.

When a new face is detected in an image of a video stream received from a camera, the computing system can begin tracking the face from frame to frame within the video stream. For example, the computing system can place a bounding box around a detected face and follow the pixels that make up the face as it moves across the field of view of the camera, and thus, across the frames of the video stream. The computing system can assess the quality of the depiction of the new face in each (or at least a portion of the) images received from the camera. Once an image having at least a threshold quality depiction of the new face is obtained (e.g., by having a quality score that exceeds a quality threshold), the computing system can compare the new face depicted in the quality image to faces depicted in images stored in the local cache to determine whether the new face matches a face of a known person that has an image stored in the local cache. If there is a match, the computing system can associate the known person with the person depicted in the quality image and with the quality image. In this way, information identifying the person can be presented in a user interface with the video stream. In addition, the person can be tracked from frame to frame, e.g., until the person's face is no longer visible in images of the video stream.

If the face of the person in the quality image does not match any of the faces depicted in the images stored in the local cache, the computing system can send the image to another computing system that compares the image to the larger database of images of known people. If there is a match with an image stored in the database, data identifying the matching person can be sent back to the computing system and the computing system can associate the person with the image. As the comparison at the database can take longer and consume more computing resources than the comparison at the local cache, the use of the local cache can improve the speed at which faces are identified and reduce the amount of computing resources and bandwidth consumed when identifying people depicted in images.

The face recognition system can track faces from frame to frame in a video stream while the face remains visible in the image frames, e.g., without having to compare the face to any images. At least one image of the person's face, e.g., a highest quality image of the person's face, can be stored in the local cache with an association with the person or an identifier for the person. The person may walk out of the view of a camera or turn in a direction where the person's face is not in view of the camera, resulting in the person no longer being tracked. The person's face may later come back into view of the camera, e.g., by turning or walking back in front of the camera. In this example, the face recognition system may not automatically associate the person's face with that of the previously tracked person. Rather than treat the person's face as a new person that has not previously been identified or tracked, the face recognition system can compare one or more images of the person's face to images stored in the local cache to determine whether the person's face matches the face of a person that has been previously identified by the face recognition system. If the face does not match a face depicted in an image stored in the local cache, the face recognition system can have the image compared to images stored in the larger database to identify the person. If the face does match a face depicted in an image stored in the local cache, the face recognition system can associate the face with the matching person without querying the larger database. If the face does not match a face depicted in images stored in the local cache or images stored in the database, a new record can be created for the person in the local cache and/or in the database. The new record can include one or more images of the person, e.g., a highest quality image of the person, and a unique identifier for the person.

To reduce the number of images to which a new image is compared, even at the local cache, the face recognition system can identify a subset of people that may be depicted in the image. For example, the subset of people may include people that were recently, e.g., within a threshold amount of time, in the view of a camera from which the new image was received. This subset would include people that recently walked out of the view of the camera or that turned away from the camera (i.e., people who remain in view of the camera but whose face is at least partially blocked so as to interfere with a facial recognition process). In another example, the face recognition system can be part of a system that includes multiple cameras. A person may walk out of the view of a first camera and into the view of a second camera. When the face recognition system receives an image of a person from the second camera that was not in previous images received from the second camera (e.g., images received from the second camera within a threshold amount of time before the image was received), the face recognition system can identity people that left the view of other cameras, e.g., the first camera, and that were moving in a direction that may put them in view of the second camera. The face recognition system can then compare the received image to images of the identified people to identify the person in the received image. If there is a match, the face recognition system does not have to query the larger database to identify the person depicted in the received image.

FIG. 1 is an environment 100 in which an example face recognition system 110 identifies people depicted in images. The face recognition system 110 includes a face tracker 115 that may be implemented in one or more computing systems. The face tracker 115 receives video streams from a set of cameras 105A-105F. For example, the set of cameras 105A-105F may be arranged to monitor a particular area 102, such as a mall, a park, a casino floor, an airport, an outside area of a city, etc. The cameras 105A-105F may include video cameras that each send a respective video stream to the face tracker 115. The cameras 105A-105F can include cameras having a fixed field of view and/or cameras that may move, e.g., rotate, pan, tilt, be an aerial camera, or a camera on a mobile device. Thus, the cameras 105A-105F may be fixed or mobile.

Each video stream received from a camera 105A-105F includes a sequence of image frames. For example, each video stream can include twenty-five to thirty or more image frames per second. The image frames of the video streams are referred to herein as images.

The face tracker 115 can analyze the images received from the cameras 105A-105F to identify people depicted in the images and/or to track people depicted in the images. For example, the face tracker 115 can identify a person depicted in a video stream received from a camera and track the person from frame to frame within the video stream while the person is visible in images of the video stream.

In some implementations, the face tracker 115 can present one or more of the video stream(s) to a user on one or more display device using a user interface 119. In the user interface 119, the face tracker 115 can automatically highlight one or more people (e.g., people's faces) depicted in the presentation of the video stream, e.g., using a box around the person's face or by color or display intensity differentiation. The user interface 119 can also display data identifying the person or a unique anonymous identifier for the person. For example, the user interface 119 can display data identifying people that are currently being tracked in the video stream.

When the face tracker 115 receives an image of a video stream, the face tracker 115 can analyze the image, e.g., using face detection, to determine whether the image depicts a new face, e.g., a face that was not previously being tracked by the face tracker 115. If the face tracker 115 detects a new face in the received image, the face tracker 115 can assign a new identifier to the face and attempt to identify the person whose face was detected using a local cache 117 and/or an image analysis system 130.

The image analysis system 130 includes or is connected to a person database 132 that includes data for multiple people. For example, the person database 132 can include a respective set of data for each of multiple people, e.g., people that have previously been identified in a video stream or known by other means. The sets of data can include one or more images of each of the multiple people, data identifying each person, and other appropriate data for each person. In some implementations, the person database 132 can store data identifying a highest quality image for each person that can be used to identify the person in other images, e.g., images received by the face tracker 115. The highest quality image may be determined by the image analysis system 130 from among multiple images of a same person based on factors such as the distance of the person from the camera, lighting conditions, sharpness or blurriness of the image, angle of the person's face relative to the view of the camera, degree of occlusion of the person's face from view of the camera, number of other persons in the image, or a combination of these.

The person database 132 can include data for a large number of known people. In contrast, the local cache 117 can include data for a smaller number of people, such as a proper subset of the people that have data in the person database 132. For example, the local cache 117 can include data for people determined to have been depicted in images captured by the cameras 105A-105F within a particular period of time, e.g., within the last hour, last day, last week, etc. The data for each person can include one or more images of the person. In another example, the local cache 117 can include data and image(s) for people expected to be in the view of the cameras 105A-105F.

If a person has not been detected in an image received from one of the cameras 105A-105F within the particular period of time, the data for the person may be removed from the local cache 117. For example, if a person was detected in the video streams earlier in the day, but has not been detected in the video streams for over an hour, it may be less likely that a face that appears in the video streams belongs to that person. Thus, the data for that person can be removed from the local cache 117 freeing up memory space in the local cache 117 and reducing the number of image comparisons at the local cache 117.

In some implementations, the local cache 117 includes a highest quality image for each person for which data is stored in the local cache 117. The face tracker 115 and/or the image analysis system 130 can select a highest quality image for a person from a set of images that depict the person's face. The quality of each image can be based on a blur of the person's face in the image, lighting of the person's face in the image, a quantity of shadows on the face in the image, an angle of the face in the image, or other appropriate features of the face in the image. For example, an image that depicts the person's entire face from the front may have a higher quality score than an image that depicts the side of the person's face or the back of the person's head.

When the face tracker 115 detects, in an image received from a camera, a face that is not currently being tracked, e.g., a face that was not in a previous image received from the camera, the face tracker 115 can first attempt to identify the face using the local cache 117. For example, the face tracker 115 may compare one or more images of the face to faces depicted in images stored in the local cache 117. The one or more images of the detected face can include the first image in which the face was detected and/or additional images received after the first image. For example, the face tracker 115 may gather a set of images of the face to improve the chances that a high quality image is included in the set. In another example, the face tracker 115 may identify the highest quality image in the set to compare to the images stored in the local cache 117. In yet another example, the face tracker 115 may assess the quality of each image that depicts the face until the face tracker 115 identifies an image that has at least a threshold quality depiction of the face. The face tracker 115 can then modify this quality image, e.g., by cropping and/or rotating the quality image, and comparing the face depicted in the quality image to faces depicted in images stored in the local cache 117.

If the face tracker 115 determines that the face depicted in the received image(s) matches a face depicted in an image stored in the local cache 117, the face tracker 115 can assign the person or identifier of the matching image to the detected face. The face tracker 115 can then continue to track the person from frame to frame and display data identifying the person at the user interface 119.

In some implementations, the face tracker 115 determines whether a face matches another face based on a level of similarity between the faces. For example, the face tracker 115 may determine that a face matches another face if the level of similarity meets or exceeds a threshold level of similarity.

If the face tracker 115 determines that the face depicted in the received image(s) does not match a face depicted in an image stored in the local cache 117, the face tracker 115 can send one or more images of the face to the image analysis engine 130. For example, the face tracker 115 may send the one or more images to the image analysis engine 130 over a network 125, such as a local area network (LAN), a wide area network (WAN), the Internet, or a combination thereof.

The image analysis engine 130 can compare the one or more images that depict the face to images stored in the person database 132. As the person database 132 is larger and includes data, including images, for more people than the local cache 117, the comparison process performed by the image analysis engine 115 may take longer and/or demand more computing resources than the comparison process performed by the face tracker 115. If the image analysis engine 130 finds an image that depicts a face that matches the face depicted in the one or more images received from the camera, the image analysis engine 130 can send data identifying the person depicted in the matching image to the face tracker 115. The face tracker 115 can then associate the person with the images received from the camera that depict the person's face and the face depicted in the images.

In addition, the face tracker 115 can store at least one of the images of the person in the local cache 117. The image(s) stored in the local cache 117 for the person may include an image received from one of the cameras 105A-105F, an image sent to the image analysis engine 130, and/or an image that was previously stored in the person database 132. For example, the face tracker 115 may store the highest quality image for the person in the local cache 117. In this way, if the person leaves the view of the cameras 105A-105F and returns, the person's face can be identified in images captured after the person returns using the image(s) of the person stored in the local cache 117 and without using the image analysis engine 130, the person database 132, and the network 125.

In some implementations, the image analysis engine 130 can determine whether one of the images received from the face tracker 115 is a highest quality image for the person. For example, if one of the images of the person captured by a camera and sent to the image analysis engine 130 is of a higher quality than the image(s) stored in the person database, the image analysis engine 130 may update the person database 132 to include the higher quality image in place or, or in addition to, the previously stored image(s) of the person.

If the face of the person does not match a face depicted in an image stored in the local cache 117 or in the person database 132, the image analysis system 130 may create a new record for the unknown person in the person database 132. The image analysis system 132 can also notify the face tracker 115 that the person is unknown. In response, the face tracker 115 can create a new record for the unknown person in the local cache 117 and continue tracking the unknown person.

In some implementations, the face tracker 115 can identify a subset of people to which a detected face is likely to belong based on one or more criteria. The face tracker 115 may compare the image that depicts the detected face to images of the identified people instead of, or prior to, comparing the image to other images stored in the local cache 117. For example, the face tracker 115 may first compare the image that depicts the detected face to images stored in the local cache 117 that depicts the faces of the identified subset of people. If the detected face does not match the face of a person in the identified subset of people, the face tracker 115 may compare the image that depicts the detected face to other images stored in the local cache 117. If no match is found in the local cache 117, the face tracker 115 may send the image to the image analysis engine 130.

In one example, the face tracker 115 may consider the relative locations, or relative field of view, of the cameras 105A-105F and/or the direction of travel of one or more person(s) identified in video streams of the cameras to identify a subset of people to which the detected face may belong. For example, the cameras 105-D and 105-E have overlapping fields of view. As the person 106 moves from position A to position B, the person 106 may move into the field of view of the camera 105-E. As the person 106 has been in the field of view of the camera 105-D, the face tracker 115 may have already identified the person 106 and stored one or more images of the person in the local cache 117. As the person 106 moves from position A to position B, the face tracker 115 can monitor the person's direction of travel and location. When the face of the person 106 is first detected in an image of the video stream received from the camera 105-E, the face tracker 115 can determine that the detected person may be the person 106 based on the direction of travel of the person 106 and the relative locations of the cameras 105-D and 105-E. In response, the face tracker 115 may compare the face of the person depicted in one or more images received from the camera 105-D to the face of the person 106 depicted in images stored in the local cache 117 prior to comparing the received image(s) to images of other people.

Similarly, as the person 106 moves from position B to position C, the face tracker 115 can determine that new faces detected in the video streams received from the cameras 105-B and 105-F may be the person 106 based on the person's direction of travel and the relative locations of the cameras 105-E, 105-B, and 105-F. In response the face tracker 115 may compare one or more images of the person 106 received from the cameras 105-B and 105-E to images of the person 106 stored in the local cache 117 prior to comparing the received image(s) to images of other people.

In another example, the face tracker 115 may consider the amount of time between a time at which a person left the view of one camera and entered the view of another camera to identify a subset of people to which the detected face may belong. For example, the cameras 105-D and 105-E may not have overlapping fields of view, but the field of view may be close. In this example, as the person 106 moves from position A to position B, the person 106 may leave the field of view of the camera 105-D before entering the field of view of the camera 105-E. If the person 106 is first detected in an image of the video stream received from the camera 105-E within a threshold amount of time after the person 106 was last detected in an image of the video stream received from the camera 105-D, the face tracker 115 can determine that the person detected in the video stream received from the camera 105-E may be the person 106. In response, the face tracker 115 may the face depicted of the person 106 depicted in one or more images received from the cameras 105-E to the face of the person 106 depicted in one or more images stored in the local cache 116 prior to comparing the received image(s) to images of other people.

In another example, the face tracker 115 may consider the amount of time between a time at which a person was last detected in an image of the video stream received from one camera and a time at which a person was first detected in an image of the video stream of the same camera to identify a subset of people to which the detected face may belong. For example, the person 106 may turn around such that the person's face is no longer detected in images of the video stream received from the camera. The person may also walk out of the field of view of the camera and return to the field of view of the camera. In these examples, the face tracker 115 may compare an image received from the camera and that includes a face that was not identified in the previous image received from the camera to images of people that were last detected in images received from the camera within a threshold amount of time. For example, the face tracker 115 may compare the received image to images of people that were detected in images received from the camera within the last five minutes, in the last twenty minutes, or some other appropriate time period.

Figure 2:
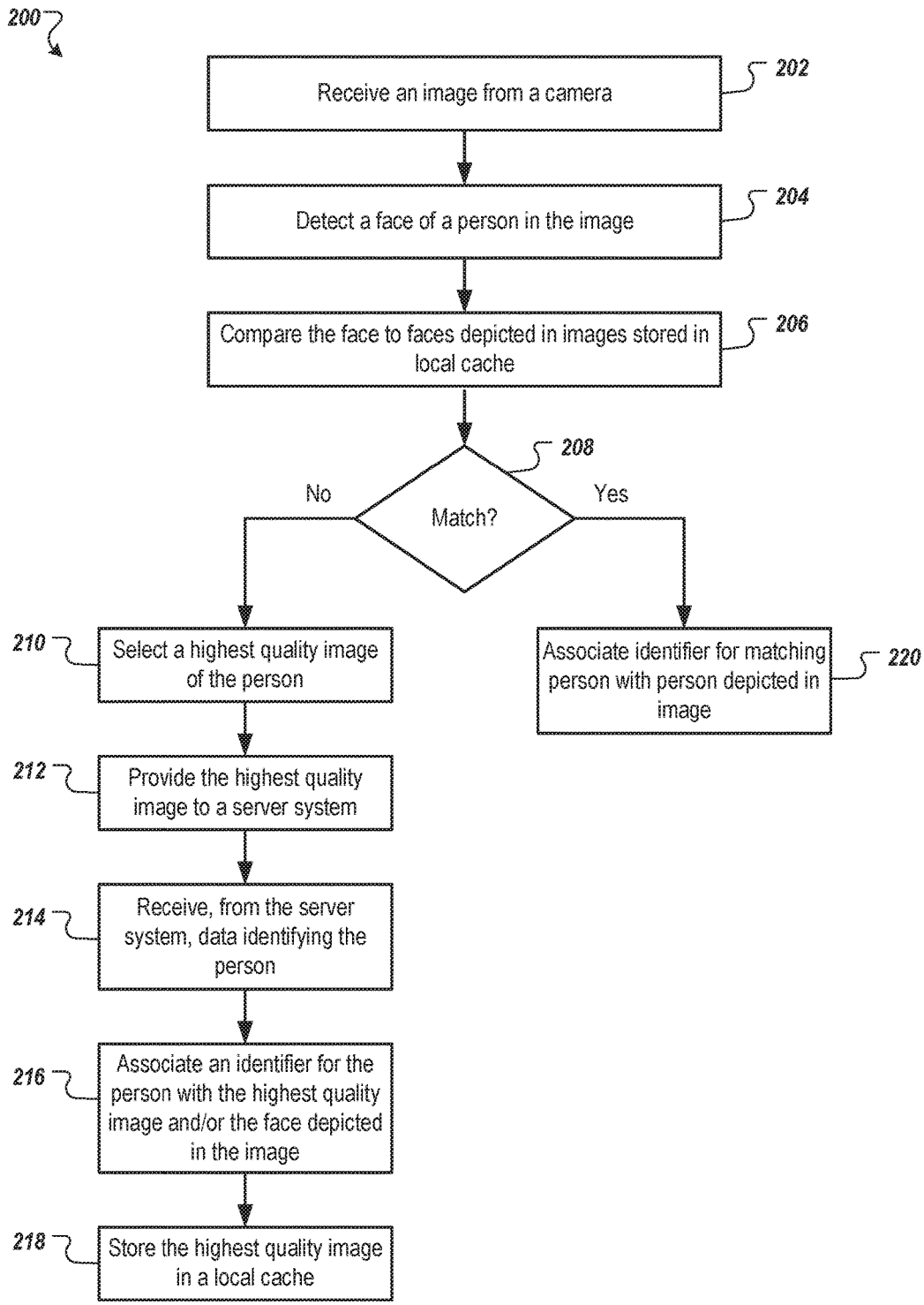
FIG. 2 is a flow diagram of an example process for identifying a person depicted in an image.

FIG. 2 is a flow diagram of an example process 200 for identifying a person depicted in an image. The process 200 can be implemented by one or more computer programs installed on one or more computing systems in one or more locations. The process 200 will be described as being performed by an appropriately programmed system of one or more computers, e.g., the face tracker 115 of FIG. 1.

The system receives an image from a camera (202). For example, the system may receive a video stream from a camera that is part of a set of multiple cameras. The video stream can include multiple image frames per second. The image may be one or the image frames from the video stream.

The system detects a face of a person in the received image (204). For example, the system may determine whether a face or multiple faces are depicted in each of the image frames received from the camera. The system may use face detection techniques based on edges, shapes, colors, and/or motion between multiple images to detect faces depicted in the images. In some implementations, the system may detect a face that is not currently being tracked by the system. For example, the system may track faces that have previously been identified using a bounding box around each person or the face of each person and by following moving pixels within the bounding box(es). The system may identify a new face in the image that is not currently being tracked using the bounding boxes.

The system compares the detected face to faces depicted in images stored in a local cache (206). For example, the system may compare features of the detected face to features of faces depicted in images stored in the local cache. The local cache can include images of people that were received from cameras of the set of cameras within a threshold amount of time from when the image that depicts the detected face was received. For example, the local cache can include images received within an hour before the image that depicts the detected face was received. As described above, the images stored in the local cache may include one or more images of people that were previously identified. Thus, each face depicted in an image stored in the local cache may be associated with, e.g., assigned to, a person to which the face has previously been determined to belong.

In some implementations, the system selects a particular image from multiple images of the detected face for comparison with the images stored in the local cache. For example, the system may receive multiple images of the person's face from the camera. The system may select, from the multiple, images a highest quality image that includes a highest quality depiction of the face of the person. In another example, the system may keep collecting images of the person's face until the system identifies an image that has at least a threshold quality depiction of the face. The system may then select this quality image for comparison with the images stored in the local cache.

The system determines whether the detected face matches a face depicted by an image stored in the local cache based on the comparison (208). In some implementations, the system determines whether a face matches another face based on a level of similarity between the faces. For example, the system may determine that a face matches another face if the level of similarity meets or exceeds a threshold level of similarity.

If the system determines that the detected face matches a face depicted by an image stored in the local cache, the system may associate an identifier for the person with the received image and/or with the face in the received image. For example, if multiple faces are detected in the received image, the image may be associated with multiple people. In this example, each face may be associated with a corresponding person. Subsequently, data identifying the person(s) may be presented at a user interface. For example, the system may display the video stream received from the camera within a user interface. The system may also supplement the video stream with a box around the detected face and/or with data identifying the person near the person's face. Such identifying data for the person may not have been displayed prior to determining the match, but may be automatically displayed upon determining the match.

If the system determines that the detected face does not match a face depicted by an image stored in the local cache, the system selects a highest quality image of the face (210). For example, the system may detect the face in multiple images after first detecting the face in the received image. In a particular example, the system may track the face for a particular amount of time, e.g., one minute, and collect images that depict the face over that particular amount of time. From the collected images, the system may select the highest quality image. As described above, the quality of each image can be based on a blur of the person's face in the image, lighting of the person's face in the image, a quantity of shadows on the face in the image, an angle of the face in the image, or other appropriate features of the face in the image.

The system provides the highest quality image to a server system (212). For example, the system may transmit the highest quality image to a server system that includes a person database with images of multiple people and other data for the multiple people. The person database may include images of many more people than the local cache. For example the local cache may include images for a subset of the people that have images in the person database. Each image in the person database may be associated with a person depicted in the image.

The system receives, from the server system, data identifying the person whose face is depicted in the highest quality image (214). For example, the server system may compare the face depicted in the highest quality image to face depicted in images stored in the person database. If there is a match, the server system can send data identifying the person in the matching image to the system.

The system associates an identifier for the person, or other data identifying the person, with the highest quality image and/or with the face depicted in the highest quality image (216). In this way, the identifier or the data identifying the person can be presented in the user interface with the video stream that depicts the person.

The system stores the highest quality image and the identifier or other data identifying the person in the local cache (218). When the system detects faces in subsequently received images, the system can compare the detected faces to the highest quality image of the face. If there is a match, the identifier for the person can be associated with the detected faces.

Figure 3:
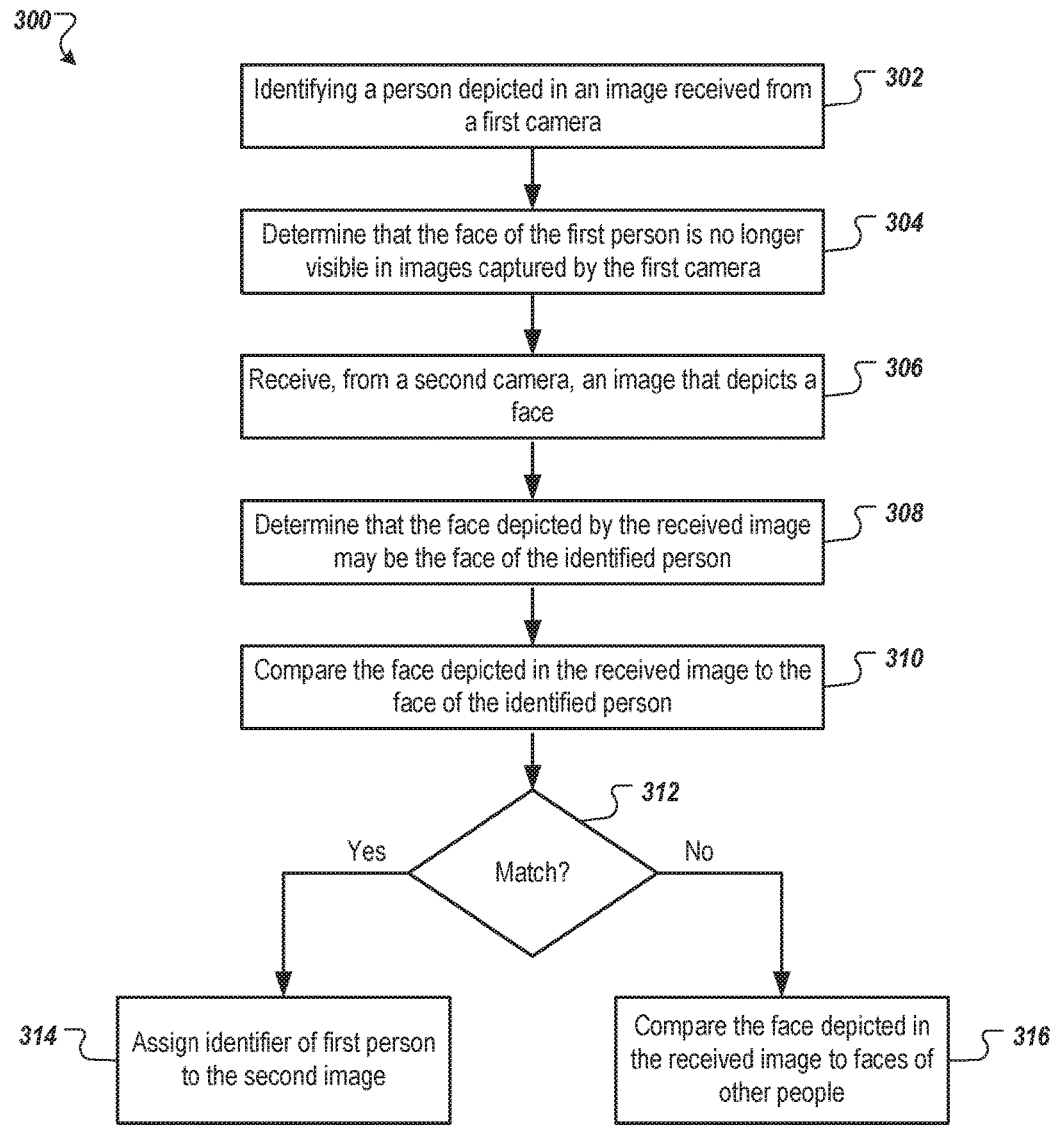
FIG. 3 is a flow diagram of an example process for identifying a person depicted in an image.

FIG. 3 is a flow diagram of an example process 300 for identifying a person depicted in an image. The process 300 can be implemented by one or more computer programs installed on one or more computing systems in one or more locations. The process 300 will be described as being performed by an appropriately programmed system of one or more computers, e.g., the face tracker 115 of FIG. 1.

The system identifies a person depicted in an image received from a first camera of a set of multiple cameras (302). The system may detect a face in the image and compare the face to faces depicted in images of known people to identify the person. For example, the system may identify the person using the example process 300 illustrated in FIG. 3 and described above.

The system determines that the person is no longer visible in images captured by the first camera (304). For example, the person may leave the field of view of the camera or may turn away from the first camera such that the person's face is no longer visible in images received from the first camera. The system may determine that the person is no longer visible in images captured by the first camera in response to not detecting the person's face in images received from the first camera over for at least a threshold amount of time.

The system receives, from a second camera different from the first camera, an image that depicts a face (306). For example, the system may detect a face in the image that was not depicted in a previous image received from the camera. In a particular example, a person may turn to face the camera or walk into the field of view of the second camera.

The system determines that the face depicted in the image received from the second camera may be the person identified in the image received from the first camera (308). The system may make this determination based on the relative locations of the first and second cameras. For example, if the two cameras are close, e.g., within a threshold distance of each other, the person may have left the field of view of the first camera and entered the field of view of the second camera.

The system may determine that the face depicted in the image received from the second camera may be the person identified in the image received from the first camera based on a time at which the face of the person was no longer visible in images captured by the first camera and a time at which the image depicting the face was captured by the second camera. For example, if the first camera is close to the second camera and the image that depicts the face was captured by the second camera within a threshold amount of time of the person leaving the field of view of the first camera, the face may belong to the person that left the field of view of the first camera.

The system may determine that the face depicted in the image received from the second camera may be the person identified in the image received from the first camera based on a direction of travel of the person and the relative locations of the cameras. For example, the system may determine that the person is traveling in a direction that leaves the field of view of the first camera and enters the field of view of the second camera. In this example, the system may determine that the person that left the field of view of the first camera and is no longer depicted in images received from the first camera may be the person that entered the field of view of the second camera and is depicted in images received from the second camera.

In response to determining that the face depicted in the image received from the second camera may be the person identified in the image received from the first camera, the system compares the face depicted in the image received from the second camera to the face of the identified person depicted in an image of the identified person (310). For example, the system may compare the face depicted in the image received from the second camera to a highest quality image of the identified person or another image that depicts the face of the identified person.

The system determines whether the face depicted in the image received from the second camera matches the face of the identified person based on the comparison (312). If the system determines that the faces match, an identifier for the person is assigned to the image received from the second image and/or to the face depicted in the image received from the second camera (314).

If the system determines that the images do not match, the system compares the face depicted in the image received from the second camera to faces of other people (316). For example, the system may compare the face depicted in the image received from the second camera faces depicted in images stored in a local cache and/or images stored in a person database to identify the person depicted in the image, as described above.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
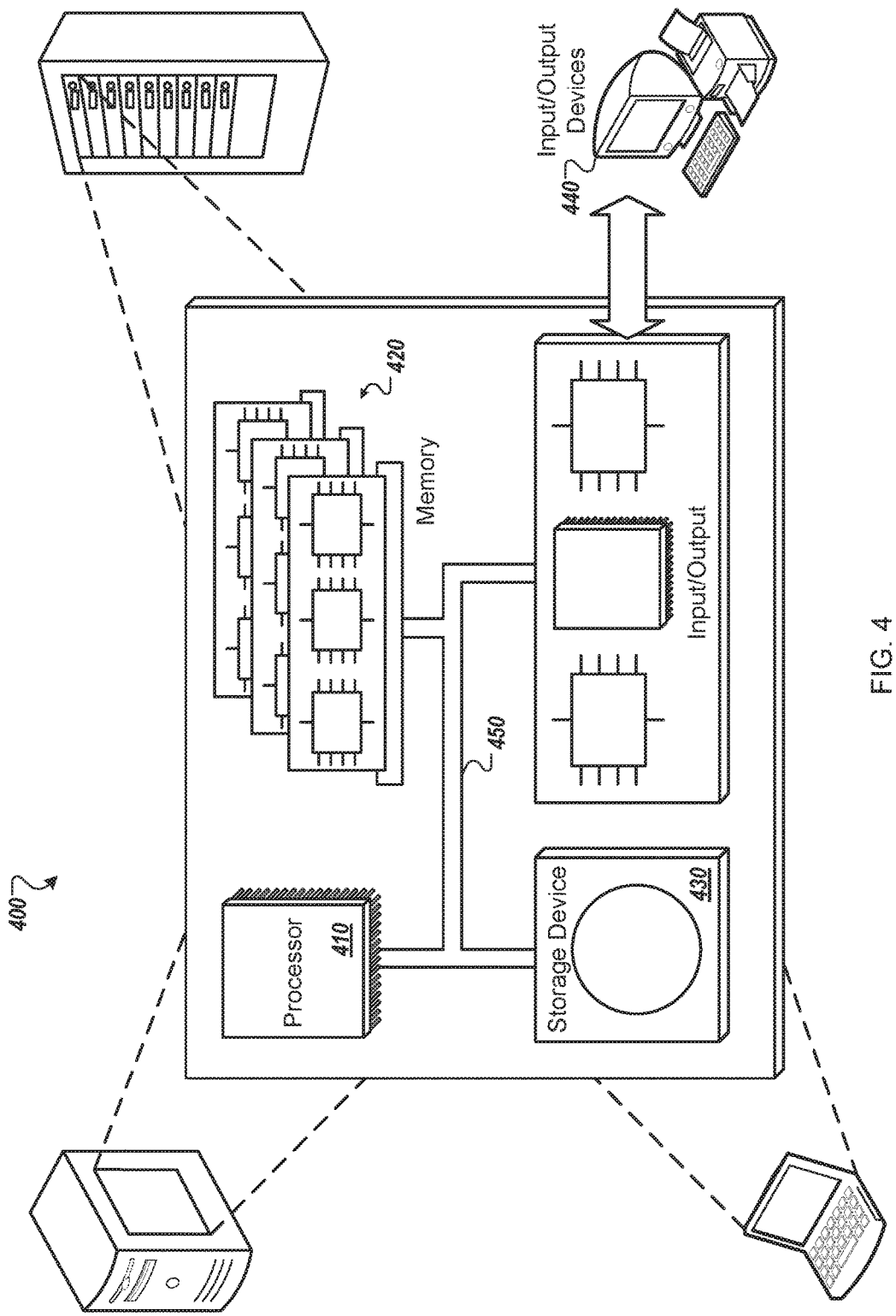
FIG. 4 is a block diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    receiving, by a computing system, a first image from a first camera of a set of one or more cameras;
    detecting, in the first image, a face of a first person;
    comparing, by the computing system, the first image to a set of images stored in a local cache of the computing system,
        wherein the set of images stored in the local cache are images of one or more persons that have been recognized in at least one image captured by the set of one or more cameras during a recent time period, and
        wherein the computing system is configured to remove from the local cache images of persons not recognized in any image captured by the set of one or more cameras during the recent time period, such that the first image is compared only to images of the one or more persons that have been recognized in at least one image captured by the set of one or more cameras during the recent time period;
    determining, based on the comparison, whether the face of the first person matches a face of a person depicted by at least one image of the set of images stored in the local cache; and
    in response to determining that the face of the first person does not match a face of a person depicted by at least one image of the set of images stored in the local cache:
        selecting, by the computing system and from a plurality of images of the first person captured by the set of one or more cameras, a highest quality image of the first person that includes a highest quality depiction of the face of the first person, the plurality of images including the first image;
        providing the highest quality image of the first person to a server system that stores data for multiple people, wherein the server system compares the highest quality image of the first person to images from the data for the multiple people to identify the first person, including comparing the highest quality image of the first person to images of persons stored at the server system that were captured prior to the recent time period; and receiving, by the computing system and from the server system based on a result of comparing the highest quality image of the first person to the images of persons stored at the server system that were captured prior to the recent time period, data that identifies the first person.

2. The method of claim 1, further comprising:

associating an identifier for the first person with the highest quality image of the first person; and storing the highest quality image of the first person in the local cache as part of the set of images.

3. The method of claim 2, further comprising:

receiving by the computing system, a second image of the first person;

detecting, by the computing system, a face in the second image;

comparing, by the computing system, the second image to the set of images;

determining, by the computing system, that the face in the second image matches the face of the first person depicted in the highest quality image; and in response to determining that the face in the second image matches the face of the first person depicted in the highest quality image, associating the identifier for the first person with the second image without providing the second image to the server system.

4. The method of claim 1, wherein each image of the set of images depicts a person for which the computing system has received, from the server system, data that identifies the person depicted by the image in response to the image being provided to the server system.

5. The method of claim 1, further comprising:

determining that the face of the first person is no longer visible in images captured by the first camera;

receiving, from a second camera of the one or more cameras, a sequence of images captured by the second camera;

determining that a second image in the sequence of images depicts a face that was not visible in images captured by the second camera prior to the second image being captured or prior to the first person becoming no longer visible in images captured by the first camera;

determining, based at least on relative locations of the first camera and the second camera, that the face depicted by the second image may be the face of the first person;

comparing the second image to one or more images of the face of the first person;

determining, based on the comparison of the second image to one or more images of the face of the first person, that the face depicted by the second image matches the face of the first person; and assigning an identifier for the first person to the second image.

6. The method of claim 5, wherein determining, based at least on relative locations of the first camera and the second camera, that the face depicted by the second image may be the face of the first person further comprises determining that the face depicted by the second image may be the face of the first person based on a time at which the face of the first person became no longer visible in images captured by the first camera and a time at which the second image was captured.

7. The method of claim 5, wherein determining, based at least on relative locations of the first camera and the second camera, that the face depicted by the second image may be the face of the first person further comprises determining that the face depicted by the second image may be the face of the first person based on a travel direction of the first person with respect to a location of the first camera and a location of the second camera.

8. The method of claim 1, wherein selecting the highest quality image of the first person comprises:

identifying multiple images of the first person; and determining the highest quality image of the first person from among the multiple images.

9. The method of claim 1, wherein the highest quality image of the first person is an image that has at least a threshold quality depiction of the face of the first person.

10. A system, comprising:

a data processing apparatus; and a memory storage apparatus in data communication with the data processing apparatus, the memory storage apparatus storing instructions executable by the data processing apparatus and that upon such execution cause the data processing apparatus to perform operations comprising:

receiving a first image from a first camera of a set of one or more cameras;

detecting, in the first image, a face of a first person;

comparing the first image to a set of images stored in a local cache of the data processing apparatus, wherein the set of images stored in the local cache are images of one or more persons that have been recognized in at least one image captured by the set of one or more cameras during a recent time period, and wherein the data processing apparatus is configured to remove from the local cache images of persons not recognized in any image captured by the set of one or more cameras during the recent time period, such that the first image is compared only to images of the one or more persons that have been recognized in at least one image captured by the set of one or more cameras during the recent time period;

determining, based on the comparison, whether the face of the first person matches a face of a person depicted by at least one image of the set of images; stored in the local cache and in response to determining that the face of the first person does not match a face of a person depicted by at least one image of the set of images stored in the local cache:

selecting, from a plurality of images of the first person captured by the set of one or more cameras, a highest quality image of the first person that includes a highest quality depiction of the face of the first person, the images including the first image;

providing the highest quality image of the first person to a server system that stores data for multiple people, wherein the server system compares the highest quality image of the first person to images from the data for the multiple people to identify the first person, including comparing the highest quality image of the first person to images of persons stored at the server system that were captured prior to the recent time period; and receiving, from the server system based on a result of comparing the highest quality image of the first person to the images of persons stored at the server system that were captured prior to the recent time period, data that identifies the first person.

11. The system of claim 10, wherein the operations comprise:

associating an identifier for the first person with the highest quality image of the first person; and storing the highest quality image of the first person in the local cache as part of the set of images.

12. The system of claim 11, wherein the operations comprise:

receiving a second image of the first person;

detecting a face in the second image;

comparing the second image to the set of images;

determining that the face in the second image matches the face of the first person depicted in the highest quality image; and in response to determining that the face in the second image matches the face of the first person depicted in the highest quality image, associating the identifier for the first person with the second image without providing the second image to the server system.

13. The system of claim 10, wherein each image of the set of images depicts a person for which the data processing apparatus has received, from the server system, data that identifies the person depicted by the image in response to the image being provided to the server system.

14. The system of claim 10, wherein the operations comprise:

determining that the face of the first person is no longer visible in images captured by the first camera;

receiving, from a second camera of the one or more cameras, a sequence of images captured by the second camera;

determining that a second image in the sequence of images depicts a face that was not visible in images captured by the second camera prior to the second image being captured or prior to the first person becoming no longer visible in images captured by the first camera;

determining, based at least on relative locations of the first camera and the second camera, that the face depicted by the second image may be the face of the first person;

comparing the second image to one or more images of the face of the first person;

determining, based on the comparison of the second image to one or more images of the face of the first person, that the face depicted by the second image matches the face of the first person; and assigning an identifier for the first person to the second image.

15. The system of claim 14, wherein determining, based at least on relative locations of the first camera and the second camera, that the face depicted by the second image may be the face of the first person further comprises determining that the face depicted by the second image may be the face of the first person based on a time at which the face of the first person became no longer visible in images captured by the first camera and a time at which the second image was captured.

16. The system of claim 14, wherein determining, based at least on relative locations of the first camera and the second camera, that the face depicted by the second image may be the face of the first person further comprises determining that the face depicted by the second image may be the face of the first person based on a travel direction of the first person with respect to a location of the first camera and a location of the second camera.

17. The system of claim 10, wherein selecting the highest quality image comprises:

identifying multiple images of the first person; and determining the highest quality image of the first person from among the multiple images.

18. A computer program product, encoded on one or more non-transitory computer storage media, comprising instructions that when executed by one or more computers cause the one or more computers to perform operations comprising:

receiving, by the one or more computers, a first image from a first camera of a set of one or more cameras;

detecting, in the first image, a face of a first person;

comparing, by the one or more computers, the first image to a set of images stored in a local cache of the one or more computers, wherein the set of images stored in the local cache are images of one or more persons that have been recognized in at least one image captured by the set of one or more cameras during a recent time period, and wherein the one or more computers are configured to remove from the local cache images of persons not recognized in any image captured by the set of one or more cameras during the recent time period, such that the first image is compared only to images of the one or more persons that have been recognized in at least one image captured by the set of one or more cameras during the recent time period;

determining, based on the comparison, whether the face of the first person matches a face of a person depicted by at least one image of the set of images stored in the local cache; and in response to determining that the face of the first person does not match a face of a person depicted by at least one image of the set of images stored in the local cache:

selecting, by the one or more computers and from a plurality of images of the first person captured by the set of one or more cameras, a highest quality image of the first person that includes a highest quality depiction of the face of the first person, the plurality of images including the first image;

providing the highest quality image of the first person to a server system that stores data for multiple people, wherein the server system compares the highest quality image of the first person to images from the data for the multiple people to identify the first person, including comparing the highest quality image of the first person to images of persons stored a the server system that were captured prior to the recent time period; and receiving, by the one or more computers and from the server system based on a result of comparing the highest quality image of the first person to images of persons stored at the server system that were captured prior to the recent time period, data that identifies the first person.

19. The computer program product of claim 18, wherein the operations comprise:

associating an identifier for the first person with the highest quality image of the first person; and storing the highest quality image of the first person in the local cache as part of the set of images.

20. The computer program product of claim 19, wherein the operations comprise:
receiving by the one or more computers, a second image of the first person;
detecting, by the one or more computers, a face in the second image;
comparing, by the one or more computers, the second image to the set of images;
determining, by the one or more computers, that the face in the second image matches the face of the first person depicted in the highest quality image; and
in response to determining that the face in the second image matches the face of the first person depicted in the highest quality image, associating the identifier for the first person with the second image without providing the second image to the server system.

\* \* \* \* \*

UNITED STATES PATENT AND TRADEMARK OFFICE
CERTIFICATE OF CORRECTION

PATENT NO.      : 10,055,646 B2
APPLICATION NO. : 15/169113
DATED           : August 21, 2018
INVENTOR(S)     : Cyrille Bataller et al.

It is certified that error appears in the above-identified patent and that said Letters Patent is hereby corrected as shown below:

In the Claims

In Column 20, Line 56, Claim 18, delete "a" and insert -- at --, therefor.

Signed and Sealed this
Ninth Day of October, 2018

Andrei Iancu
*Director of the United States Patent and Trademark Office*